United States Patent
Jackson

(10) Patent No.: US 7,143,519 B2
(45) Date of Patent: Dec. 5, 2006

(54) ALIGNMENT SYSTEM WITH LOCKING TURNTABLES AND SKID PLATES

(75) Inventor: David A. Jackson, Points Roberts, WA (US)

(73) Assignee: Snap-On Incorporated, Kenosha, WI (US)

( * ) Notice: Subject to any disclaimer, the term of this patent is extended or adjusted under 35 U.S.C. 154(b) by 0 days.

(21) Appl. No.: 11/024,985

(22) Filed: Dec. 30, 2004

(65) Prior Publication Data

US 2006/0143931 A1    Jul. 6, 2006

(51) Int. Cl.
*G01B 5/24* (2006.01)

(52) U.S. Cl. ..................... 33/203.12; 33/203

(58) Field of Classification Search ................ 33/203, 33/203.12, 203.13, 203.14, 600
See application file for complete search history.

(56) References Cited

U.S. PATENT DOCUMENTS

| | | | |
|---|---|---|---|
| 2,208,063 A * | 7/1940 | Wochner | 33/203 |
| 3,143,810 A * | 8/1964 | McClendon | 33/203.12 |
| 3,181,248 A * | 5/1965 | Manlove | 33/203 |
| 3,231,983 A * | 2/1966 | Bender | 33/203 |
| 4,394,798 A * | 7/1983 | Beissbarth | 33/203.14 |
| 4,897,926 A * | 2/1990 | Altnether et al. | 33/203.14 |
| 4,924,591 A * | 5/1990 | Brodu | 33/203.14 |
| 5,024,001 A | 6/1991 | Borner et al. | |
| 5,535,522 A | 7/1996 | Jackson | |
| 5,724,743 A | 3/1998 | Jackson | |
| 5,832,617 A | 11/1998 | Gill | |
| 6,209,209 B1 | 4/2001 | Linson et al. | |
| 6,532,062 B1 | 3/2003 | Jackson et al. | |
| 2002/0144414 A1 * | 10/2002 | Jackson et al. | 33/203.12 |
| 2003/0142294 A1 | 7/2003 | Jackson et al. | |
| 2004/0026591 A1 * | 2/2004 | Lambrecht et al. | 33/203.12 |

\* cited by examiner

*Primary Examiner*—G. Bradley Bennett
(74) *Attorney, Agent, or Firm*—McDermott Will & Emery LLP

(57) ABSTRACT

An alignment measurement system for a vehicle includes an alignment sensing system and a suspension relaxing system. The suspension relaxing system is configured to receive at least one wheel of the vehicle and is operable between a plurality of states. The alignment sensing system is operatively connected to the suspension relaxing system to select a state of the suspension relaxing system. In a first state, the suspension relaxing system maintains the wheel of the vehicle stationary when the wheel is received by the suspension relaxing system, and in a second state, the suspension relaxing system allows the wheel to turn and/or translate. Prior to performing a measurement on the alignment of the vehicle, the alignment sensing system directs the suspension relaxing system to be operated in the second state.

20 Claims, 6 Drawing Sheets

ALIGNMENT SYSTEM WITH LOCKING TURNTABLES AND SKID PLATES

TECHNICAL FIELD

The disclosure relates generally to motor vehicle wheel alignment and, more specifically, to a vehicle wheel alignment system that controls the locking and unlocking of turntables and skid plates at certain times during the alignment of the wheels.

BACKGROUND ART

Motor vehicle alignment systems are important for ensuring that the alignments of wheels on a vehicle are within the specifications provided by motor vehicle manufacturers. If the wheels are out of alignment, there may be excessive or uneven wear of the wheels. In addition, the performance of the vehicle, particularly handling and stability, may be adversely affected if the wheels are not properly aligned. As used herein, the term "wheel" or "vehicle wheel" refers to the tire and wheel assembly found on a motor vehicle. Such an assembly generally includes a conventional tire that is mounted on a metal wheel or "rim."

The wheels of a motor vehicle may be aligned in a number of ways. For example, an operator or an alignment technician can use a vision imaging system such as a computer-aided, three-dimensional (3D) machine vision alignment system having optical sensing devices, such as cameras, to determine the positions of various objects. Although such machine vision systems are typically used for alignment purposes, these systems can also be used to obtain other positional and angular orientation information about a motor vehicle. Examples of such apparatus and methods are disclosed in U.S. Pat. No. 5,724,743, entitled "Method and Apparatus for Determining the Alignment of Motor Vehicle Wheels," issued to Jackson, et al. on Mar. 10, 1998 and in U.S. Pat. No. 5,535,522, entitled "Method and Apparatus for Determining the Alignment of Motor Vehicle Wheels," issued to Jackson, et al. on Jul. 16, 1996, each incorporated herein by reference.

Prior to measuring the alignment of a vehicle or performing the realignment of the wheels of the vehicle, it is standard practice within the industry to place the suspension of the vehicle in a "relaxed" condition. Devices commonly used for this purpose are low-friction turntables/turnplates and low-friction skid/slip plates. Prior to alignment, one or more wheels of the vehicle are placed on these devices, and the turntable and skid plate allow the vehicle wheel to turn and move both longitudinally and laterally to relax the forces on the wheels. Otherwise, if the wheels were not placed in a relaxed condition, misalignment of the wheels may create forces on the wheels that under or over exaggerate a misalignment problem, and the realignment of the wheels will not be based upon correct alignment data.

Notwithstanding that turntables and skid plates are used with alignment systems, these devices may be not always be properly used by an operator. Prior to positioning a vehicle onto a rack for measurement and/or realignment, the turntables and skid plates are locked into position. Once the wheels of the vehicle have been positioned on the turntables and skid plates, the turntables and skid plates are unlocked and the wheels allowed to float freely, which places the vehicle's suspension in a relaxed state. However, after the vehicle has been proper positioned onto the rack, a common error is that the turntables and skid plates are not unlocked prior to measurement of the alignment of the vehicle, and this creates the aforementioned problem of the realignment being based upon incorrect alignment data. There is, therefore, a need for an alignment system that controls the locking and unlocking of turntables and skid plates at certain times during the alignment of the wheels.

SUMMARY OF THE DISCLOSURE

In one aspect, an alignment system is provided for measuring the alignment of a vehicle. The alignment measurement system includes an alignment sensing system and a suspension relaxing system. The suspension relaxing system is configured to receive at least one wheel of the vehicle and is operable between a plurality of states. The alignment sensing system is operatively connected to the suspension relaxing system to select a state of the suspension relaxing system. In a first state, the suspension relaxing system maintains the wheel of the vehicle stationary when the wheel is received by the suspension relaxing system, and in a second state, the suspension relaxing system allows the wheel to turn and/or translate after being received by the suspension relaxing system. Prior to performing a measurement on the alignment of the vehicle, the alignment sensing system directs the suspension relaxing system to be operated in the second state.

In another aspect, the suspension relaxing system is positioned on a rack and includes a turntable, a skid plate, and one or more release and securement devices attached to the turntable and the skid plate. Depending upon the state, the release and securement device either prevents the turntable from rotating and the skid plate from translating or allows the turntable to rotate and the skid plate to translate.

In one aspect of the suspension relaxing system, the release and securement device has a first portion and a second portion movable relative to one another into first and second positions. In one state, the first portion and/or the second portion are moved relative to one another into the first position, which prevents rotation and/or translation of the first portion relative to the second portion, and in another state, the first portion and/or the second portion are moved relative to one another into the second position, which allows rotation and/or translation of the first portion relative to the second portion. The alignment sensing system is connected to the release and securement device to control movement of the first portion and/or the second portion relative to one another.

In another aspect of the suspension relaxing system, the suspension relaxing system includes a first portion, a second portion, and a release and securement device. In one state, the first portion contacts the second portion, which prevents rotation and/or translation of the first portion relative to the second portion, and in the second state, the first portion is separated from the second portion by a film of a fluid from the release and securement device, which allows rotation and/or translation of the first portion relative to the second portion. The alignment sensing system controls a pressure of the fluid entering the release and securement device.

Other aspects and advantages of the present disclosure will become apparent to those skilled in this art from the following description of preferred aspects taken in conjunction with the accompanying drawings. As will be realized, the disclosed concepts are capable of other and different embodiments, and its details are capable of modifications in various obvious respects, all without departing from the spirit thereof. Accordingly, the drawings, disclosed aspects, and description are to be regarded as illustrative in nature, and not as restrictive.

BRIEF DESCRIPTION OF THE DRAWINGS

The foregoing and other features, aspects and advantages of the present concepts are described in the following detailed description which examples are supplemented by the accompanying drawings, in which.

DETAILED DESCRIPTION OF THE PREFERRED EMBODIMENTS

Figure 1:
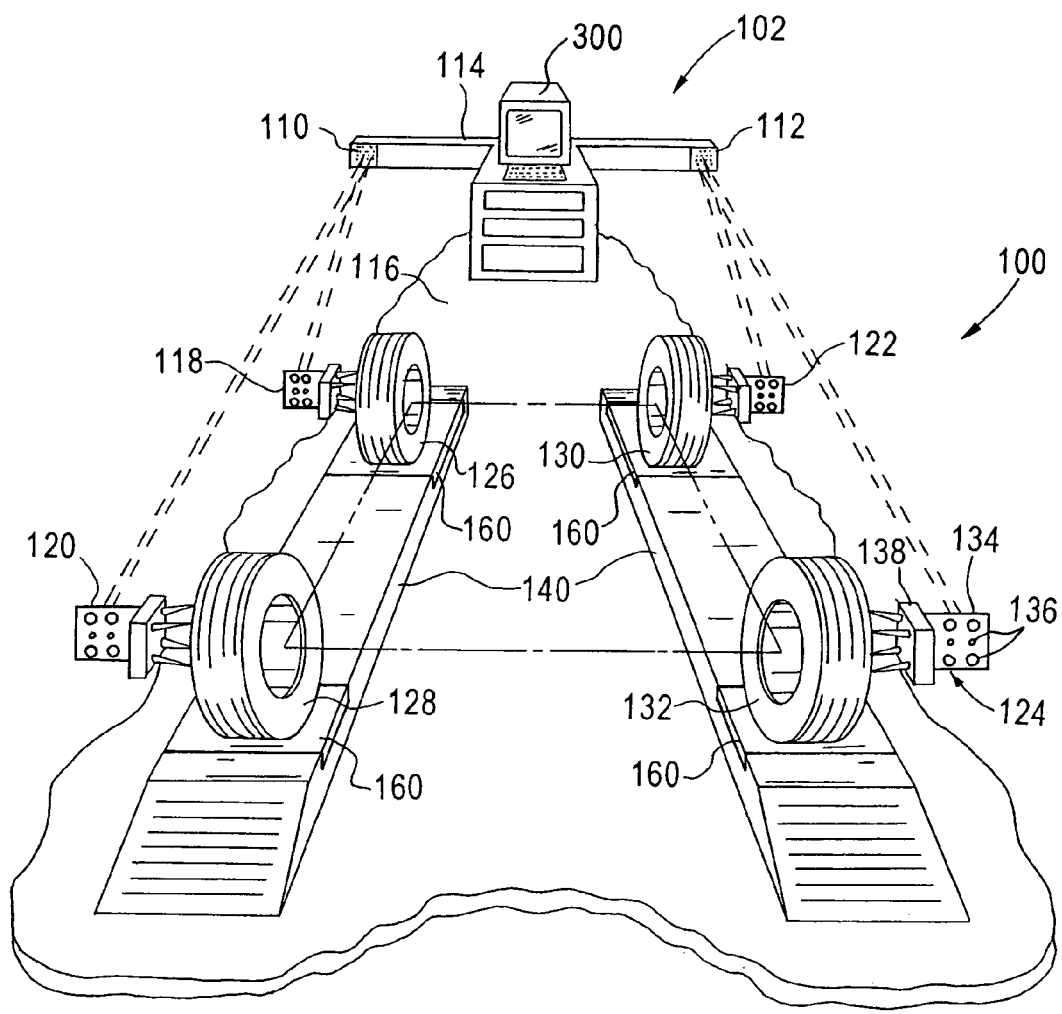
FIG. 1 shows an exemplary alignment system, according to the disclosure.

In accord with the disclosed concepts, there is provided, as shown in FIG. 1, an alignment system 100 used to determine the position of wheels 126, 128, 130, 132 on a vehicle and to aid in the alignment of the vehicle. The alignment system 100 includes an alignment sensing system 102, and the alignment sensing system 102 has a controller 300 and a pair of fixed, spaced-apart cameras 110, 112 mounted on a beam 114. The beam 114 has a length sufficient to position the cameras 110, 112 respectively outboard of the sides of the vehicle to be imaged by the position determination system 100. Also, the beam 114 positions the cameras 110, 112 high enough above the shop floor 116 to ensure that the two targets 118, 120 on the left side of the vehicle are both within the field of view of the left side camera 110, and two targets 122, 124 on the right side of the vehicle are both within the field of view of the right side camera 112.

A vehicle under test is driven onto the lift 140. Targets 118, 120, 122, 124 are mounted on each of the wheels 126, 128, 130, 132 of the vehicle, with each target 118, 120, 120, 124 including a target body 134, target elements 136, and an attachment apparatus 138. The attachment apparatus 138 attaches the target 118, 120, 120, 124 to wheel 126, 128, 130, 132. An example of an attachment apparatus is described in U.S. Pat. No. 5,024,001, entitled "Wheel Alignment Rim Clamp Claw" issued to Borner et al. on Jun. 18, 1991, incorporated herein by reference. Other types of attachment apparatus may also be used. The target elements 136 are positioned on the target body 134, and examples of target bodies 134 and target elements 112 are described in U.S. Pat. No. 5,724,743.

The targets 118, 120, 122, 124, once attached to the wheel rims, are then oriented so that the target elements 136 on the target body 134 face the respective camera 110, 112. The vehicle and model year can then entered into the alignment sensing system 102 along with other identifying parameters, such as vehicle VIN number, license number, owner name, etc.

The location of the targets 118, 120, 122, 124 relative to the rim of the wheels 126, 128, 130, 132 to which the targets are attached are typically known to an accuracy of about 0.01" and about 0.01°. It should be understood that the position determination system 100 is not limited to these accuracies. Once the targets 118, 120, 122, 124 have been imaged in one position, the wheels 126, 128, 130, 132 are rolled to another position and a new image can be taken. Using the imaged location of the targets 118, 120, 122, 124 in the two positions, the actual position and orientation of the wheels 126, 128, 130, 132 and wheel axis can be calculated by the alignment sensing system 102. Although the distance between the two positions varies, the distance is often approximately 8 inches.

Figure 2A:
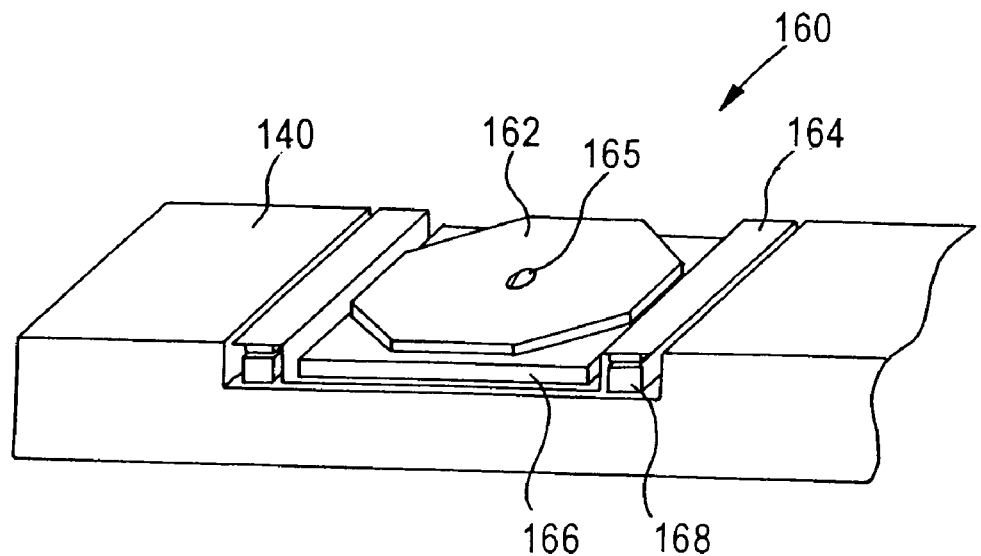
FIG. 2A is a perspective of a combined turntable and skid plate.
Figure 2B:
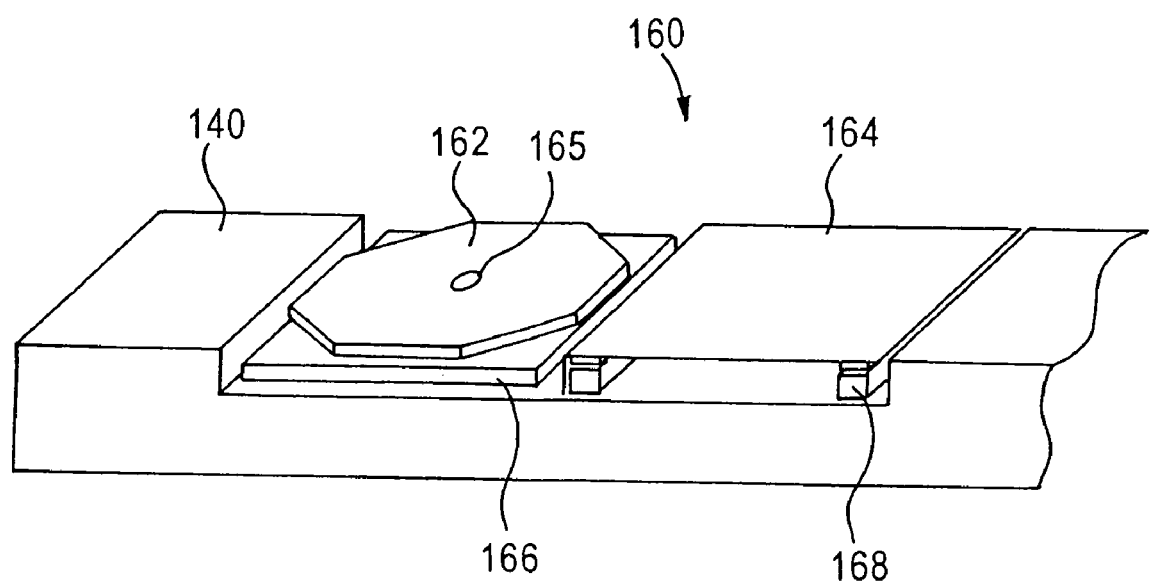
FIG. 2B is a perspective of turntable separate from a skid plate.

As illustrated in FIGS. 2A and 2B, the rack 140 includes one or more suspension relaxation systems 160 (i.e., turntables/skid plates) configured to allow a vehicle wheel to turn and translate (i.e., move both longitudinally and/or laterally) to relax forces on the wheel and suspension of the vehicle. As used herein, when the vehicle wheel is described as turning, this turning/rotation is about an axis different than the normal axis of rotation of the wheel, typically perpendicular to a contact plane between the vehicle wheel and the turntable. Many types of turntable/skid plate combinations 160 are known to exist and the alignment system 100 is not limited as to a particular type or configuration. For example, as illustrated in FIG. 2A, the turntable 162 and the skid plate 164 can be integrated to provide both angular and lateral relaxation at a single position on the rack 140. In another example, as illustrated in FIG. 2B, the turntable 162 and the skid plate 164 can be detached from one another so that lateral relaxation and angular relaxation are provided to the wheel at separate locations on the rack 140.

In the illustrated example, a top portion of the turntable 162 rotates relative to a base portion 166 via a shaft 165 to allow angular relaxation of the suspension. With regard to the skid plate 164, a top portion of the skid plate 164 is located on rails 168 that allow lateral relaxation of the suspension. Other types of devices capable of providing angular rotation and lateral movement are also acceptable.

According to the present alignment system 100, each turntable/skid plate combination 160 may include at least one actuated release and securement device 174 (shown in FIGS. 3A, 3B, 4A, 4B, and 5). During operation, the release and securement device 174 selectively allows the turntable 162 to rotate or prevent rotation, and selectively allows the skid plate 164 to longitudinally and/or laterally move or remain fixed. A single release and securement device 174 can be used for both the turntable 162 and the skid plate 164, or alternatively release and securement devices 174 may be provided for the turntable 162 and the skid plate 164 individually. Although not limited to the particular examples illustrated therein, FIGS. 3A, 3B, FIGS. 4A, 4B, and FIG. 5 disclose different types of actuated release and securement devices 174 capable of being used with the alignment system.

Figure 3A:
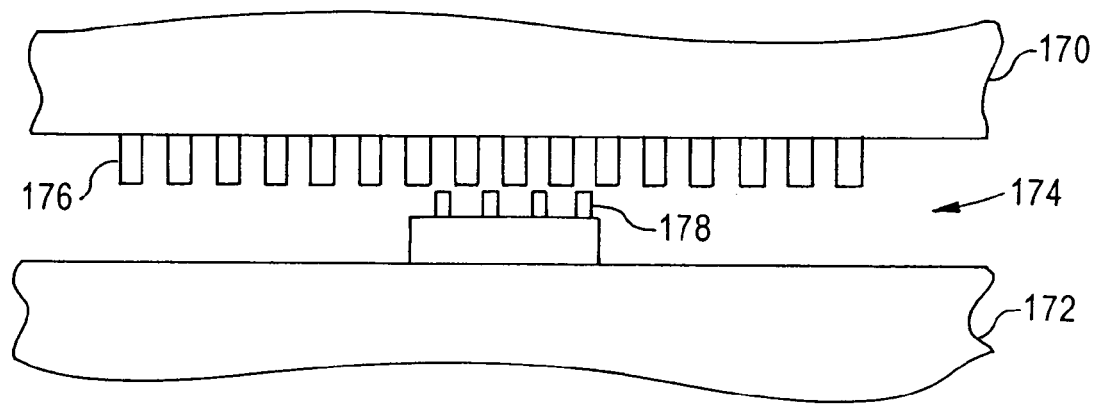
FIGS. 3A and 3B are diagrams of a release and securement device respectively in a disengaged position and an engaged position.
Figure 3B:
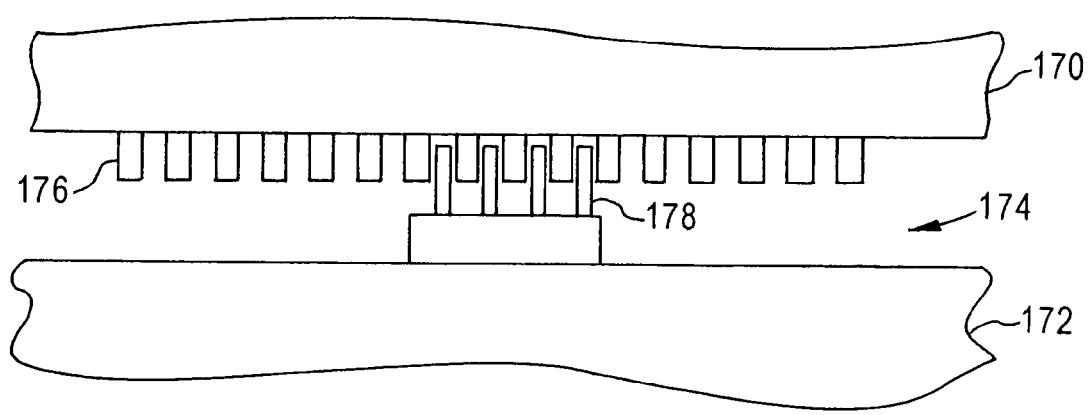

Referring to FIGS. 3A, 3B in more detail, an example of an actuated release and securement device 174 is shown that may be used with either the turntable 162 or the skid plate 164. The securement device 174 is connected to a first portion 170 and a second portion 172 of either the turntable 162 or the skid plate 164. For example, the first portion 170 may be a portion of the turntable 162 that rotates, and the second portion 172 may be a portion, such as the base portion 166 of the turntable 162 or the rack 140, that is angularly fixed. Alternatively, the second portion 172 may be a portion of the turntable 162 that rotates, and the first portion 170 may be a portion that is angularly fixed. Similarly, with regard to the skid plate 164, the first portion 170 may be a portion of the skid plate 164 that translates, and the second portion 172 may be a portion, such as the rails 168 or the rack 140, that is stationary. Alternatively, the second portion 172 may be a portion of the skid plate 164 that translates, and the first portion 170 may be a portion that is stationary.

In a disengaged position, as illustrated in FIG. 3A, the release and securement device 174 allows the first portion 170 to rotate or translate relative to the second portion 172. In FIG. 3A, fingers 178 of the release and securement device 174 engage teeth 176 of release and securement mechanism 174 and prevents the first portion 170 from rotating or translating relative to the second portion 172. The fingers 178 and teeth 176 of the release and securement mechanism 174 are only one of many possible combinations capable of preventing the rotation or translation of the first portion 170 relative to the second portion 172, and the alignment system 100 is not limited to as a particular combination so capable.

Furthermore, the manner in which the release and securement mechanism 174 is actuated is also not limited. For example, an electrical servo (not shown) can be used to raise and lower the fingers 178 to respectively engage and disengage the teeth 176. Alternatively, a hydraulic or pneumatic system (not shown) can be used to raise and lower the fingers 178 to respectively engage and disengage the teeth 176.

Figure 4A:
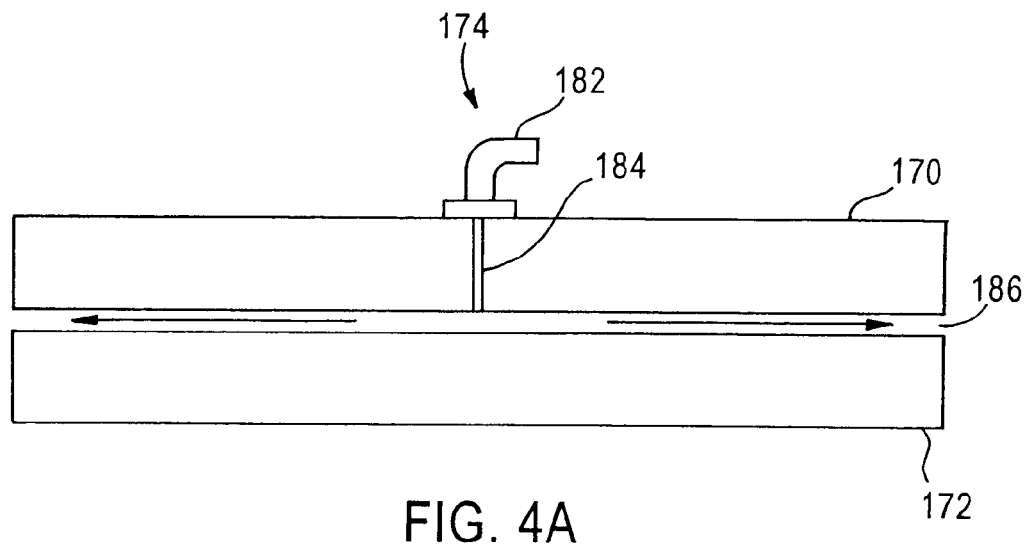
FIGS. 4A and 4B are diagrams of another release and securement device respectively in a disengaged position and an engaged position.
Figure 4B:
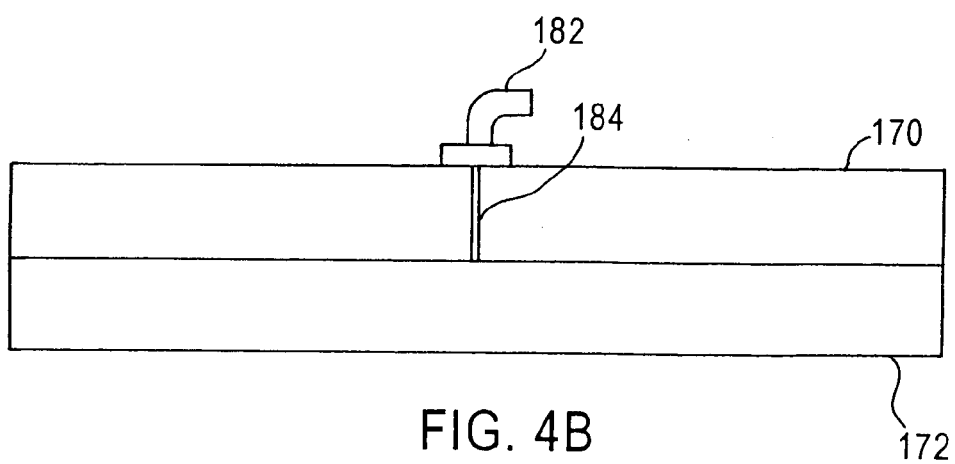

FIGS. 4A, 4B disclose another example of an actuated release and securement device 174 that may be used with either the turntable 162 or the skid plate 164. The release and securement device 174 of this particular example includes an air bearing, also referred to as a "fluid film" bearing. Although many types of air bearings may be used as the release and securement device 174, in this particular example, a passage 184 in the first portion 170 opens to a gap 186 between the first portion 170 and the second portion 172. A fluid (e.g., air) passes from a fitting 182 passes into the passage 184 and creates the gap 186 between the first portion 170 and the second portion 172. When the pressure of the air passing through the passage 184 decreases to a certain point, forces (e.g., gravity, a spring) push the first and second portions 170, 172 together.

When the first and second portions 170, 172 are apart, as illustrated in FIG. 4A, the first portion 170 can rotate or translate relative to the second portion 172. Alternatively, when the first and second portions 170, 172 are together, as illustrated in FIG. 4B, friction between the first portion 170 and the second portion 172 prevents the first portion 170 from rotating or translating relative to the second portion 172.

Figure 5:
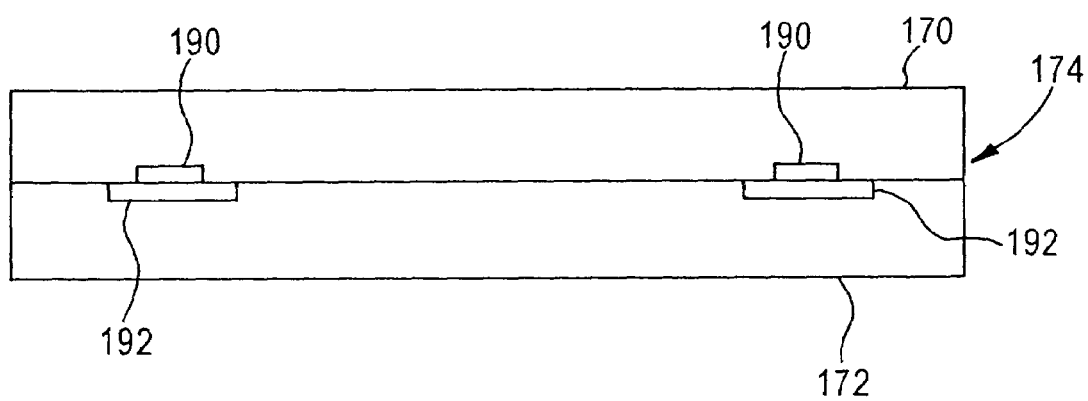
FIG. 5 is a diagrams of yet another release and securement device.

FIG. 5 discloses yet another example of an actuated release and securement device 174 that may be used with either the turntable 162 or the skid plate 164. The release and securement device 174 of this particular example includes a magnetic clutch. Magnetic clutches are well known, and the securement device 174 is not limited as to a particular type of magnetic clutch. In the present example, the magnetic clutch includes at least one electromagnet 190 attached to the first portion 170 or the second portion 172 and a magnetized material 192 attached to the other of the first portion 170 or the second portion 172.

When the electromagnet 190 pulls against the magnetized material 192, the electromagnet 190, the first and second portions 170, 172 are forced together. This force creates friction between the first portion 170 and the second portion 172 that prevents the first portion 170 from rotating or translating relative to the second portion 172. When the electromagnet 190 does not pull against the magnetized material 192, the first portion 170 can rotate or translate relative to the second portion 172.

Figure 6:
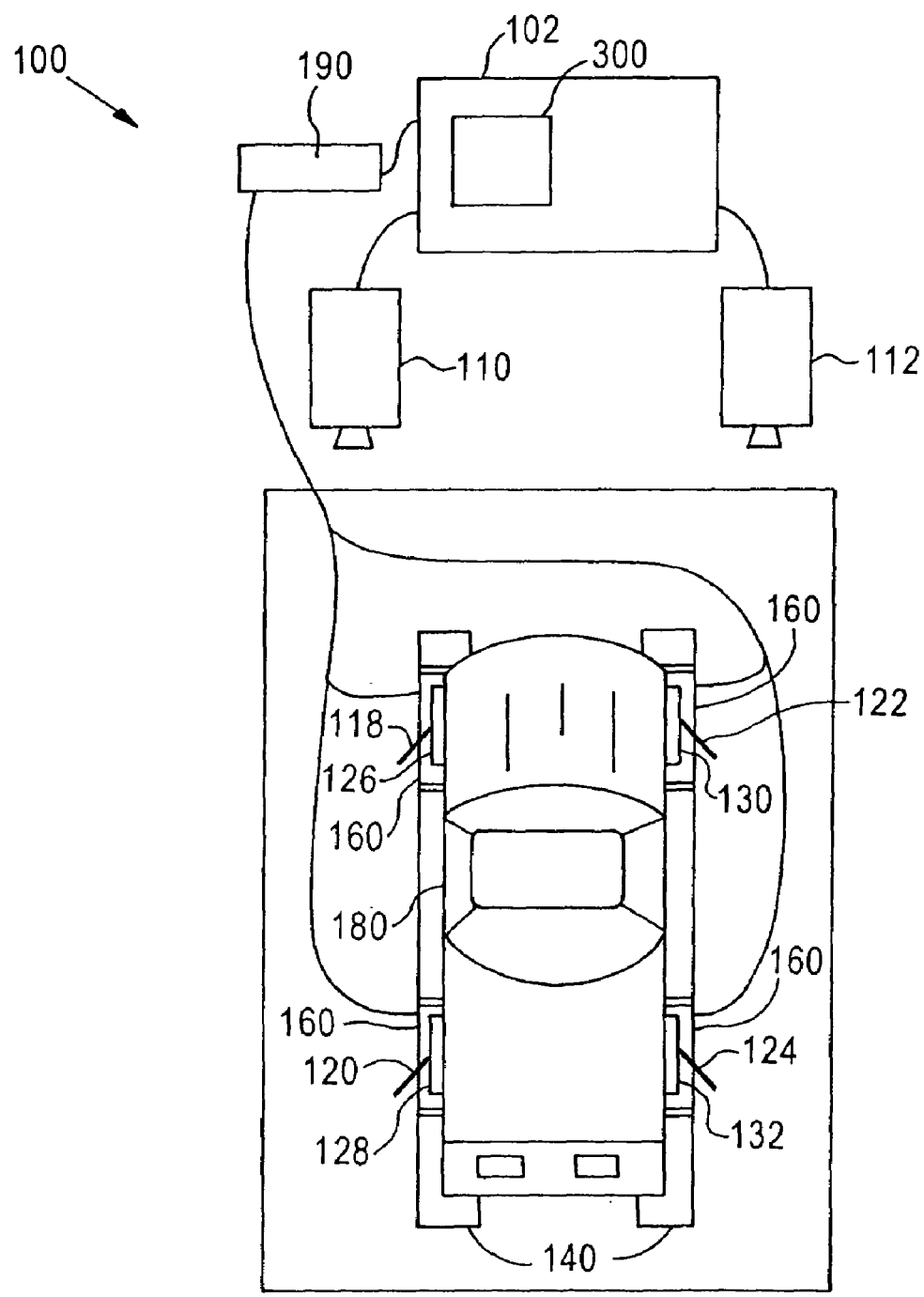
FIG. 6 is a diagram of the alignment system.

FIG. 6 schematically illustrates the alignment system 100 with both the alignment sensing system 102 and at least one turntable/skid plate combination 160. The controller 300 of the alignment sensing system 102 is also connected to an actuator 190 to control operation of the release and securement device 174 (not shown) attached to the turntable 162 and/or skid plate 164 of the turntable/skid plate combination 160. Depending upon the type of release and securement device 174 used, the actuator 190 may be, for example, a relay switch to operate an electro servo or a valve to control pressure of air being supplied to an air bearing. The connections to and from the controller 300 to the actuator 190 and to and from the actuator 190 to the release and securement system 174 are not limited in any manner, and may be electrical (wireless and non-wireless) and/or mechanical.

Once the vehicle 180 has been positioned on the lift 140, and the wheels 126, 128, 130, 132 of the vehicle 180 are on one or more of the turntable/skid plate combination 160, the controller 300 of the alignment sensing system 102 directs the actuator 190 to disengage the release and securement device 174 attached to the turntable 162 and/or skid plate 164. This allows the turntable 162 to rotate and the skid plate 164 to translate. In so doing, the suspension of the vehicle 180 is placed in a "relaxed" condition. The actuator 190 may release the turntable/skid plate combinations 160 all at once. Alternatively, one or more turntable/skid plate combinations 160 may be released prior to others.

Prior to the alignment sensing system 102 measuring the positions of the wheels 126, 128, 130, 132 of the vehicle 180 and after a position of the wheels 126, 128, 130, 132 on the rack 140 has stabilized, the controller 300 may direct the actuator 190 to engage the release and securement device 174 to prevent the turntable 162 from rotating and the skid plate 164 from translating. In so doing, accurate measurement of the positions of the wheels 126, 128, 130, 132 by the alignment sensing system 102 can be ensured.

The embodiments described herein may be used with any desired alignment sensing system, including but not limited to alignment sensing systems relying upon visual information. Various aspects of the present concepts have been discussed in the present disclosure for illustrative purposes. It is to be understood that the concepts disclosed herein is capable of use in various other combinations and environments and is capable of changes or modifications within the scope of the concepts expressed herein. Moreover, although examples of the system and method were discussed, the present concepts are not limited by the examples provided herein and additional variants are embraced by the claims appended hereto.

What is claimed is:

1. An alignment measurement system for a vehicle, comprising:
   an alignment sensing system; and
   a suspension relaxing system configured to receive at least one wheel of the vehicle and operable in a plurality of states, wherein
   in a first state of the suspension relaxing system, the suspension relaxing system maintains the at least one wheel of the vehicle stationary when the at least one wheel is received by the suspension relaxing system,
   in a second state of the suspension relaxing system, the suspension relaxing system allows the at least one wheel to turn and/or translate, and
   the alignment sensing system is operatively connected to the suspension relaxing system to select a state of the suspension relaxing system.

2. The system according to claim 1, wherein prior to performing a measurement on the alignment of the vehicle, the alignment sensing system directs the suspension relaxing system to be operated in the second state.

3. The system according to claim 2, wherein the suspension relaxing system includes a turntable and a skid plate configured to receive a single wheel of the vehicle.

4. The system according to claim 3, wherein
the suspension relaxing system includes a release and securement device attached to the turntable and the skid plate;
in the first state, the release and securement device prevents the turntable from rotating and the skid plate from translating; and
in the second state, the release and securement device allows the turntable to rotate and the skid plate to translate.

5. The system according to claim 2, wherein the suspension relaxing system includes a turntable and a skid plate separate from one another, and the turntable and the skid plate are configured to each receive the same wheel of the vehicle.

6. The system according to claim 5, wherein
the suspension relaxing system includes separate release and securement devices attached to each of the turntable and the skid plate.

7. The system according to claim 2, wherein the position determination system is a three-dimensional vision alignment system.

8. The system according to claim 2, wherein the suspension relaxing system is positioned on a rack, and in the second state of the suspension relaxing system, the suspension relaxing system allows the at least one wheel to at least one of turn and/or translate relative to the rack.

9. The system according to claim 2, wherein
the suspension relaxing system includes a release and securement device having a first portion and a second portion;
the first portion and the second portion are movable relative to one another into a first position and a second position;
in the first state of the suspension relaxing system, the first portion and/or the second portion are moved relative to one another into the first position to prevent rotation and/or translation of the first portion relative to the second portion; and
in the second state of the suspension relaxing system, the first portion and/or the second portion are moved relative to one another into the second position to allow rotation and/or translation of the first portion relative to the second portion.

10. The system according to claim 9, wherein the alignment sensing system is connected to the release and securement device to control movement of the first portion and/or the second portion relative to one another.

11. The system according to claim 2, wherein
the suspension relaxing system includes a first portion, a second portion, and a release and securement device;
in the first state of the suspension relaxing system, the first portion contacts contacting the second portion to prevent rotation and/or translation of the first portion relative to the second portion; and
in the second state of the suspension relaxing system, the first portion is separated from the second portion by a film of a fluid from the release and securement device to allow rotation and/or translation of the first portion relative to the second portion.

12. The system according to claim 11, wherein the alignment sensing system controls a pressure of the fluid entering the release and securement device.

13. A method for operating an alignment measurement system for a vehicle, the alignment measurement system including an alignment sensing system operatively connected to a suspension relaxing system configured to receive at least one wheel of the vehicle and operable between a plurality of states, in a first state of the suspension relaxing system, the suspension relaxing system maintaining the at least one wheel of the vehicle stationary when the at least one wheel is received by the suspension relaxing system, and in a second state of the suspension relaxing system, the suspension relaxing system allowing the at least one wheel to at least one of turn and/or translate, comprising the steps of:
receiving the at least one wheel by the suspension relaxing system;
directing the suspension relaxing system to be operated in the second state using the alignment sensing system after the at least one wheel is received by the suspension relaxing system; and
performing a measurement on the alignment of the vehicle using the alignment sensing system after the suspension relaxing system is operated in the second state.

14. The method according to claim 13, wherein
the suspension relaxing system includes a release and securement device having a first portion and a second portion; and
the first portion and the second portion are movable relative to one another into a first position and a second position;
the method further comprising:
in the first state of the suspension relaxing system, moving the first portion and/or the second portion relative to one another into the first position to prevent rotation and/or translation of the first portion relative to the second portion; and
in the second state of the suspension relaxing system, moving the first portion and/or the second portion relative to one another into the second position to allow rotation and/or translation of the first portion relative to the second portion.

15. The method according to claim 14, further comprising controlling movement of the first portion and/or the second portion relative to one another using the alignment sensing system.

16. The method according to claim 13, wherein
the suspension relaxing system includes a first portion, a second portion, and a release and securement device; and
in the first state of the suspension relaxing system, the first portion contacts the second portion to prevent rotation and/or translation of the first portion relative to the second portion;
the method further comprising in the second state of the suspension relaxing system, directing a film of fluid between the first portion and second portion using the release and securement device to separate the first portion and the second portion to allow rotation and/or translation of the first portion relative to the second portion.

17. The method according to claim 16, further comprising controlling a pressure of the fluid entering the release and securement device using the alignment sensing system.

18. The method according to claim 13, wherein the suspension relaxing system includes a combination of a turntable and a skid plate configured to receive a single wheel of the vehicle.

19. The method according to claim 13, wherein the suspension relaxing system includes a turntable and a skid plate separate from one another, and the turntable and the skid plate are separately configured to each receive a same single wheel of the vehicle.

20. An alignment measurement system for a vehicle, comprising:
an alignment sensing system; and
means for receiving at least one wheel of the vehicle to maintain the at least one wheel stationary or for allowing the at least one wheel to turn and/or translate, and the alignment sensing system is operatively connected to the means for receiving the at least one wheel.

* * * * *